US009862303B2

(12) United States Patent
Nogha Mbai et al.

(10) Patent No.: US 9,862,303 B2
(45) Date of Patent: Jan. 9, 2018

(54) LED LAMP WITH A BRIGHTNESS CONTROL DEVICE

(71) Applicant: Zedel, Crolles (FR)

(72) Inventors: Christophe Nogha Mbai, Bron (FR); Philippe Berrel, La Chapelle du Bard (FR)

(73) Assignee: Zedel, Crolles (FR)

(*) Notice: Subject to any disclaimer, the term of this patent is extended or adjusted under 35 U.S.C. 154(b) by 0 days.

(21) Appl. No.: 15/271,454

(22) Filed: Sep. 21, 2016

(65) Prior Publication Data

US 2017/0080849 A1  Mar. 23, 2017

(30) Foreign Application Priority Data

Sep. 21, 2015 (FR) ..................................... 15 01948

(51) Int. Cl.
- *B60Q 1/02* (2006.01)
- *B60Q 1/14* (2006.01)
- *H05B 33/08* (2006.01)
- *H05B 37/02* (2006.01)

(52) U.S. Cl.
CPC ....... *B60Q 1/1423* (2013.01); *H05B 33/0815* (2013.01); *H05B 33/0851* (2013.01); *H05B 37/0227* (2013.01)

(58) Field of Classification Search
CPC ............ H05B 33/0851; H05B 33/0854; H05B 37/0227; B60C 1/02; B60C 1/04; B60C 1/14; B60C 1/1415; B60C 1/1423
See application file for complete search history.

(56) References Cited

U.S. PATENT DOCUMENTS

| 5,537,003 | A | * | 7/1996 | Bechtel | .............. H05B 37/0218 307/10.8 |
| 5,990,469 | A | * | 11/1999 | Bechtel | ................ B60Q 1/1423 250/208.1 |
| 6,900,594 | B1 | | 5/2005 | Reichert et al. | |

(Continued)

FOREIGN PATENT DOCUMENTS

| DE | 19957210 | 5/2010 |
| EP | 2706823 | 3/2014 |

(Continued)

*Primary Examiner* — Jason M Crawford
(74) *Attorney, Agent, or Firm* — Saile Ackerman LLC; Stephen B. Ackerman (57) ABSTRACT

The present invention provides a headlamp capable of producing different light beams and fitted with a dynamic control mechanism for controlling the brightness minimizing light interference in all situations. The lamp comprises a light source with LED-type diodes; means for controlling the brightness and/or the geometry of the light beam; capturing means for generating an electrical signal representative of the reflected light intensity of the area illuminated by said light beam onto an illuminated object; and a control unit for generating control signals from the information generated by said capture system. The lamp has capturing means includes a focal system having a variable field under control of the control unit. Preferably, the capturing means includes at least two sensors with fixed focal length or, alternatively, a single sensor may be combined with a single controllable focal system electrically.

18 Claims, 4 Drawing Sheets

(56) References Cited

U.S. PATENT DOCUMENTS

| | | | |
|---|---|---|---|
| 2006/0177098 A1* | 8/2006 | Stam | B60Q 1/085 382/104 |
| 2011/0031901 A1 | 2/2011 | Huguenin et al. | |
| 2011/0291564 A1* | 12/2011 | Huang | F21V 23/0457 315/77 |
| 2014/0070699 A1* | 3/2014 | Genthon | H05B 33/0845 315/82 |
| 2014/0070700 A1* | 3/2014 | Genthon | H05B 33/0854 315/83 |
| 2016/0245688 A1 | 8/2016 | Verbeek et al. | |
| 2016/0258599 A1* | 9/2016 | Genthon | F21L 15/02 |

FOREIGN PATENT DOCUMENTS

| | | |
|---|---|---|
| EP | 2 894 398 | 7/2015 |
| FR | 2930706 | 10/2009 |
| WO | WO2014060901 | 4/2014 |
| WO | WO2015121429 | 8/2015 |

* cited by examiner

LED LAMP WITH A BRIGHTNESS CONTROL DEVICE

TECHNICAL FIELD

The present invention relates to lamps fitted with LEDs, and in particular a headlamp having an LED brightness control device

BACKGROUND

Headlamps are used in a large number of activities, including professional activities, sports and games.

Generally speaking, these lamps are intended to allow a "hand free" type of lighting which should be efficient, comfortable and ensuring maximum battery life.

The trend has been, for many years, to increase the functionality of the new headlamps.

Figure 1:
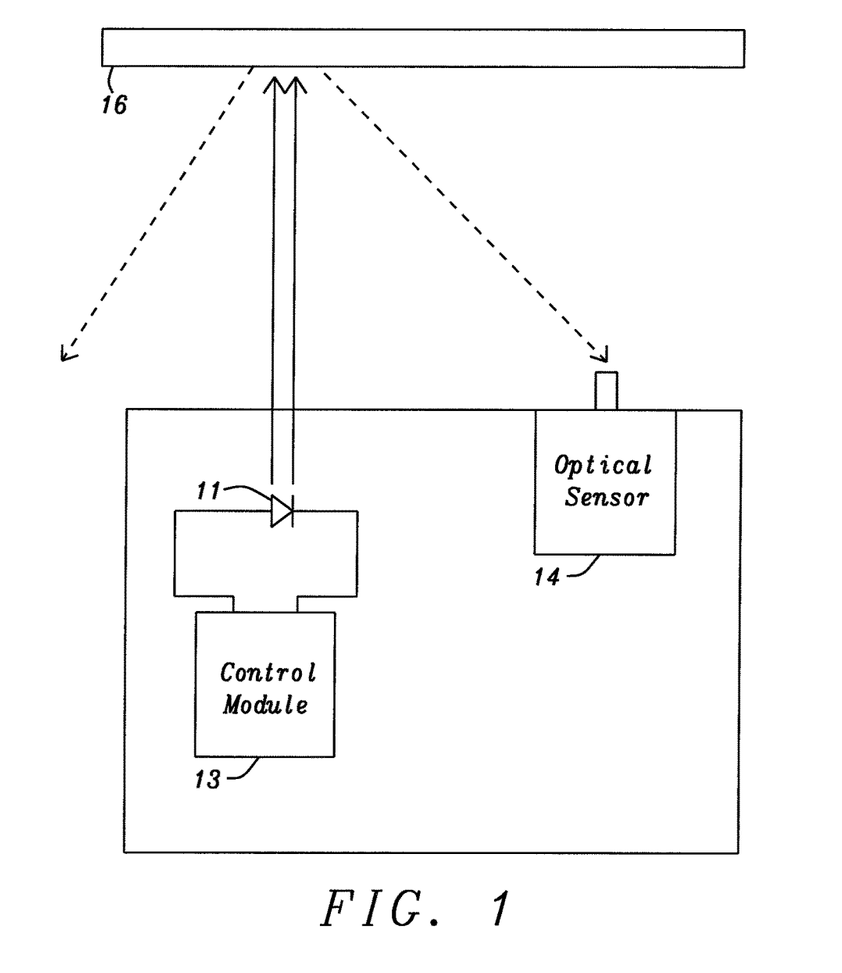
FIG. 1 illustrates an example of an headlamp known in the art, with so-called "dynamic lighting" providing regulation of the power consumption.

The present application has introduced the concept of so-called "dynamic" lighting, with the use of a regulation of the power of the light emitted by the lamp, unlike a so-called "static" mode wherein the lamp produces constant power. Patent application FR2930706 dated Apr. 24, 2008 describes a self-regulated lighting lamp which uses a light sensor for sensing the light reflected by an object illuminated by the lamp for the purpose of controlling the regulation of the intensity of the light. FIG. 1 illustrates such a lamp that includes an optical sensor 14 located in the housing in the vicinity of the light-emitting diode LED 11 for outputting a signal being representative of the light reflected by the surface of an object 16 being illuminated by the lamp. The signal is transmitted to a second input of a controller 13 for automatically controlling the power of the LED according to a predetermined threshold. In this manner, automatic control of the light beam emitted by the lamp is achieved without requiring any manual action to adjust the lighting in the environment, while managing the power consumption.

Such conventional lamp has been improved by the provision of multiple LEDs to produce separate beams respectively wide and narrow, providing great flexibility to users of this lamp, which can thus benefit from strong light to see "afar" but also comfortable viewing "closely."

This lamp shows a significant success especially within sports communities, including rock climbing, hiking and running . . . .

However it has appeared that the so-called dynamic regulation system is difficult to implement because it tends to be easily disturbed by light echoes that interfere differently for a "far" vision with a narrow beam or a "close" vision with a wide beam.

SUMMARY

It is desirable to improve the regulation mechanism of brightness to minimize interference and echoes in all situations, so that the lamp can be used in all sectors, as well as sports professionals and industrialists. It is an object of the present invention to provide a headlamp capable of producing different light beams and fitted with a dynamic control mechanism for controlling the brightness minimizing light interference in all situations.

It is another object of the present invention to provide a headlamp which can be used in multiple areas of the industry as well as by the sportsmen and hikers etc.

It is still another object of the present invention to provide a lamp with a variable geometry beam which allows immediate adaptation of the dynamic regulation of the light beam, narrow or wide, produced by the lamp.

It is a further object of the present invention to provide a headlamp fitted with new capabilities and features which can be used in a wide number of situations.

These and other objects are achieved by means of a lamp, such as a headlamp, which comprises:
  a light source having one or more LED-type diodes;
  means for controlling the brightness and/or the geometry of the light beam of said light source in response to a control information or control signal;
  capturing means for sensing light and generating an electrical signal representative of the reflected light intensity of the area illuminated by said light beam;
  a control unit for generating said control information or said control signal from the information generated by said capturing means.

The lamp a capturing means that is associated with a variable focal field controlled by said control unit to generate corresponding electrical signals at different focal lengths.

In one embodiment, the lamp comprises at least two sensors associated with distinct foci so as to generate two signals. The control unit is configured to select one among the two signals generated by the sensors so as to carry out the dynamic regulation of the brightness.

The lamp comprises a second sensor which is associated with a second optical system which is different from the first optical system associated to the first sensor so as to simultaneously generate two different information sets representative of the light reflected by the illuminated area.

The control of the light beam results from the information generated by one or/and the other sensor associated with their respective optical system, and selected by the control unit.

In another embodiment, the lamp includes a capturing system which comprises a unique sensor associated with an optical system. The system is electrically controllable and configured to be controlled by the control unit, so as to achieve a feedback control of the angle of capture of the reflection light, jointly with the generation of the control information or control signal controlling the brightness of the lamp.

In one specific embodiment, the light source comprises a display unit having at least two LEDs, each having their own focal optical system and whose power supply is controlled by said control information or control signal.

Preferably, the light source comprises one or more LED(s) associated with a controllable optical system. The optical system is controlled by said control information or said control signal.

In one particular embodiment, the lamp further includes telemetry means for determining the distance to an object. This allows the use of the measurement of distance for the generation of control information. It also provides a control signal for the light beam and/or the capture angle of said capturing means.

In one particular embodiment, the control unit (230) is configured with parameters corresponding to a plurality of predetermined profiles, wherein the configuration is performed via a USB port for communication with a computer, a touchscreen tablet, or smartphone.

The invention is particularly suitable for realizing a headlamp.

BRIEF DESCRIPTION OF THE DRAWINGS

Other features of one or more embodiments of the invention will appear from the following description of embodiments of the invention, with reference being made to the accompanying drawings.

DESCRIPTION

The examples which will be described now are particularly suitable for the realization of a lighting lamp with powerful LED diodes, and in particular a headlamp.

Clearly, there is non-limiting examples and a skilled man will be able to adapt the invention to other lighting systems to increase the operating possibilities.

Figure 2:
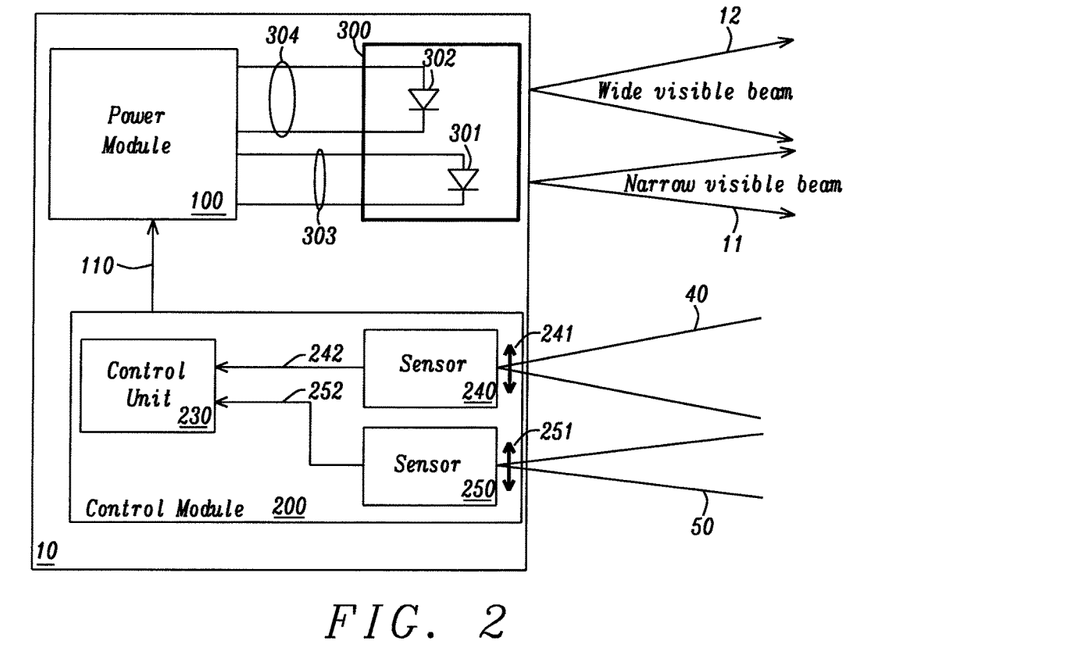
FIG. 2 illustrates a first embodiment of a lamp according to the present invention, comprising two sensors each with its own optical system.

FIG. 2 illustrates the general architecture of a first embodiment of a lamp 10—assumed to be a headlamp—which has sophisticated control means for controlling the light intensity. It is fitted with a capture system with variable focus, which is based on a set of two sensors having respectively two different fixed focuses.

Lamp 10 includes a power module 100 associated with a control module 200 and a lighting unit 300 having a plurality of LED light-emitting diodes, each LED being fitted with its own focal system. In general, the term LED will be generically used in the present description and may refer to any light emitting device such as white LED, red or a laser diode.

In the example illustrated in FIG. 2, there is shown, for the sake of simplification, a set of two diodes 301 and 302, respectively provided with their supply conductors 303 and 304 connected to the power module 100 and allowing, with their associated optical system (not shown) to produce a wide and narrow beam respectively, as shown in FIG. 2. More generally, in order to increase the brightness of the lamp, a skilled man may provide several diodes within a same focal optical system, or even multiply the number of optical systems so as to increase the usability of the lamp. Alternatively, one may also arrange a set of LEDs with a single focal system that is electrically controllable, so that a control unit 230 also generates an information/control signals for controlling the geometry of the beam light produced by the LEDs. Such an embodiment is described, in international patent application No. PCT/EP2015/053127 dated Feb. 13, 2015 filed by the applicant and published under the publication number WO2015/121429.

In a specific embodiment, the powering of the LED diodes 301 and 302, respectively via their supply conductors 303 and 304, is performed under control of information or a control signal 110 which is generated by the control module 200.

Power module 100 specifically includes all components that are conventionally found in an LED illumination lamp for producing a light beam of high intensity, and in general based on Pulse Width Modulation PWM, well known to the skilled man and similar to that known and used in class D audio circuits. The PWM modulation is controlled by the control signal 110. Generally speaking, the term "signal" mentioned above refers to an electrical quantity—current or voltage—that can cause control of the power module 100, including the PWM modulation used to supply power to the LED 301/302. This is only one particular embodiment, with the understanding that it will be possible to substitute to "control signal 110" any "control information" such a logical information stored in a register and transmitted by any appropriate means to power module 100 in order to control the transmission power of the light beam. In one particular embodiment, we can even consider the two control modules 200 and power module 100 to be integrated within the same integrated circuit.

A skilled person can therefore easily understand that that when we refer to a "control signal 110", one indiscriminately encompasses embodiments using an electrical quantity control—current or voltage—and the embodiments in which the command is affected by means of logic information transmitted within the power module 100. For this reason, one will hereinafter indiscriminately use the wordings "control signal" or "control information".

In general, switches and switching components that constitute power module 100—which can be either bipolar transistors, FETs (Field Effect Transistor) or MOS (Metal Oxide Semiconductor) or MOSFET—are well known to a skilled man. The presentation will be deliberately reduced in this regard for brevity. Likewise, the reader is invited to refer to the general literature on various aspect of the PWM modulation.

A more specific example of a power module will be described hereinafter in relation to FIG. 4. Referring back to FIG. 2, one can see that the control module 200 includes a capture system with variable focal field, based on a set at least two photo sensors, 240 and 250 whose axes are substantially parallel to the axis of the LEDs 301/302. The sensors 240 and 250 each generate an electrical signal which is respectively transmitted via appropriate circuits 242 and 252 to a control unit 230 which is able to handle these signals.

Each sensor 240 or 250 is associated with its own focal optical system, respectively 241 and 251 allowing, with separate focal optics, different angles of capture 40 and 50, respectively narrow and wide as shown in FIG. 2.

Control unit 230 is further configured for selecting, as appropriate, one among the two signals which are generated by sensors 240 and 250 for using it to control the brightness of the lamp. Thus, according to the embodiment of FIG. 2, the signals generated by sensors 240/250 can be used for generating, within control unit 230 located within control module 200, a control information or a control signal 110 in FIG. 2 dedicated to power module 100 which serves for controlling the power supply of the LEDs 301 or 302. Control signal 110 controls of the focal length of the light beam generated by the lamp, respectively narrow (far vision) or wide (near vision).

This makes it possible, by means of appropriate processing performed on the information respectively generated by the two sensors 240 and 250 to select the appropriate angle of lighting 11 or 12, to be used by the reactive or dynamic control mechanism, so as to produce a beam of light having a geometry which is well suited to the brightness produced by the headlamp.

Thus, for example, in a situation of far vision, with the production of a narrow beam with high brightness, as shown by reference 11 in FIG. 2, control unit 230 will primarily use the information produced by the associated sensor 240, associated to its optics 241 and, consequently, so as to produce a suitable regulated light beam based on sensor 240. Therefore, the dynamic control system of the brightness will be less disturbed by light clutter as the focal angle will be particularly narrow, which will be very useful when, for example, the lamp user moves inside a dark forest.

In another situation, e.g. that of a long distance runner running in a dark environment, if the runner comes behind another runner wearing clothes having strong reflection, the light regulatory mechanism of the headlamp of the former runner may be disturbed by the reflection caused by clothes worn by the latter . . . In such a situation, one may see a strong interest to use a very narrow angle (sensor 240), a few degrees, to prevent the regulatory mechanism to be spoiled by this undesired interference.

Such a very narrow field would be also very useful in the context of a user walking o the side of a road, and coming towards a highly reflective road sign which, also, might disturb the dynamic regulation mechanism controlling the brightness of the headlamp. Again, by providing a particularly narrow angle of capture, just a few degrees—one may thus minimize the interference produced by the reflective panel.

In other contexts, it will be advantageous to select sensor 250 with a wide focal length, for example up to 90 degrees to allow a form of "integration" of the light information on a large solid angle.

For example, in an industrial working environment, a mechanic may have to use the lamp with a wide beam so as to facilitate the near vision. In such a situation, control unit 230 is configured to select sensor 250 associated with a wide angle so as to integrate reflection information on a wide solid angle, which reduces the effect of unwanted reflections from shiny surfaces tools with which the headlamp user works.

Thanks to the embodiment which was described, one can see that a cabinetmaker, for instance, who performs work of sanding under the light produced by his headlamp, might be greatly hindered with the use of a narrow angle of vision causing "pumping" effect of the regulatory mechanism dynamic, as the hands move in front of the lamp. In such a situation, to avoid this annoying effect, control unit 230 then would select the other sensor 250 associated with a wide focal length, wide enough so that the electrical signal generated by the sensor becomes substantially independent of the position of the hands of cabinetmaker who, in this way, could benefit from a constant light.

As it can be seen in the many examples described above, the combination of at least two sensors associated with their own and different focal lengths. Their proper selection can significantly increase opportunities for the dynamic adjustment mechanism regulating the choice of one or the other capture angles to significantly improve the comfort of use of the lamp.

The example in FIG. 2 shows an arrangement with two separate sensors each with their own focal optics. A skilled person could clearly envisage increasing the number of sensors so as to increase the adjustment possibilities of the light regulation mechanism.

In a particular embodiment, control module 200 is configured to further include a telemetry module—for example laser telemetry—for supplying to the control unit 230 information representative of the distance to an object illuminated More generally, control unit 230 may be configured to provide new functionality as it is now possible not only to select one or other of the information generated by the sensors 240 and 250 (or any other additional sensor) but also to control the generation of respectively distinctively broad and narrow beams produced by LEDs 301 and 302.

In some embodiments, control unit 230 may thus be configured to automatically control the production of a wider or narrower cone of illumination, as is illustrated with the beam 11 and 12 of FIG. 2, and this by adapting the angles 40 and 50 associated with sensors 240 and 250.

Generally, control signal or information signal 110 is generated from the use of the information respectively provided by the two sensors 240 and 250.

Figure 3:
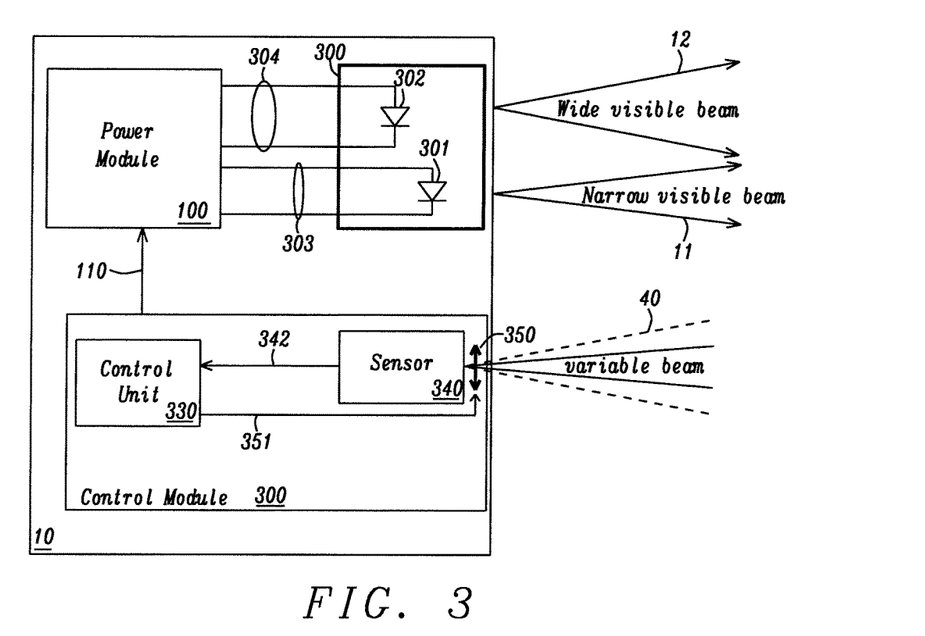
FIG. 3 illustrates a second embodiment of a lamp according to the present invention, with a single sensor associated with an electrically controllable optical system.

It is now described with reference to FIG. 3, a second embodiment which, again, includes power module 100 as well as LEDs 301 and 302, which keeps their reference numbers. However, in this embodiment, control module 200 has been substituted by a new control module 300 having a single sensor 340 associated with a focal length 350 which is electrically controllable via a control signal generated by a control unit 330 and transmitted through circuit 351. Thus, the variable focal system is now based on the combination of sensor 340 and its electrically controlled focal system 350. Sensor 340 generates electric information representative of the brightness induced by the lamp and/or reflected from an illuminated object, which is transmitted via a circuit 342 to the control unit 330.

The elements of the second embodiment which are unchanged with respect to the first embodiment shown in FIG. 2 keep their numerical reference.

In this second embodiment, one sees that control unit 330 now generates two control information sets: a first information set conveyed by the signal 110 to the power module 100 for controlling the power supply of the diodes 301/302 (via supply conductors 303/304) and a second information set conveyed by the circuit 351 for the electro-optical system 350 for controlling the solid angle of the cone of capture associated to sensor 340. For the purpose of realizing module 350, one may consider the use of any kind of system providing electrical control of the optical focus, using in particular the latest developments in micro-electronics such as MEMS micromirrors or the liquid lens-based system to provide an interface between two transparent liquids having distinct refraction indicia.

Control Unit 330 can then proceed to processing of the electrical signal generated by the sensor 350. The variable focus may be either wide or narrow depending on the circumstances, so as to jointly generate the control signals 110 and 351 to be used by the dynamic regulation system.

This will obviously create in this way an effect of "zoom" which is automatically controlled both by the angle of capture of sensor 340 and by the angle of the beam light produced by diodes 301 and 302.

The dynamic regulation mechanism becomes particularly efficient and offers new possibilities of control and adjustments. There is the possibility of an advantageous feedback control of the angle of capture of sensor 340. More generally, this embodiment associates the feedback control of the reactive or dynamic lighting together with the control of the angle of capture of the optical light sensor 340.

In particular, three zones or areas of action can be defined:
zone 1): which is the near vision zone, designated "reading zone" corresponds to the current mechanism of the reactive lighting control;
Zone 2): said working zone, which starts from the reading zone and extends up to a predetermined distance which may be adjusted by the user (or not), located midway to the user. The predetermined distance may be advantageously defined in relation to particular "profiles" associated to the user.
Zone 3): this zone of freedom, starts from the working zone and extends to infinity.

In one particular embodiment, it may be advantageous to control the angle of capture of sensor 340 in accordance with the following:

In the reading zone, the angle of view will be the widest;
In the working zone, the headlamp is configured to perform an automatic control of the angle of capture of sensor 340 to avoid uncomfortable light changes. The integration of a large volume in the sensor view area allows taking into account the majority of elements included in the immediate scene. This allows the prevention of the disturbing effects of unwanted light variations.
In the area of freedom, the angle of capture is configured to be the narrowest possible, as in the conventional dynamic regulatory mechanism. This focus prevents lights variations generated by elements located within the working zone.

Figure 4:
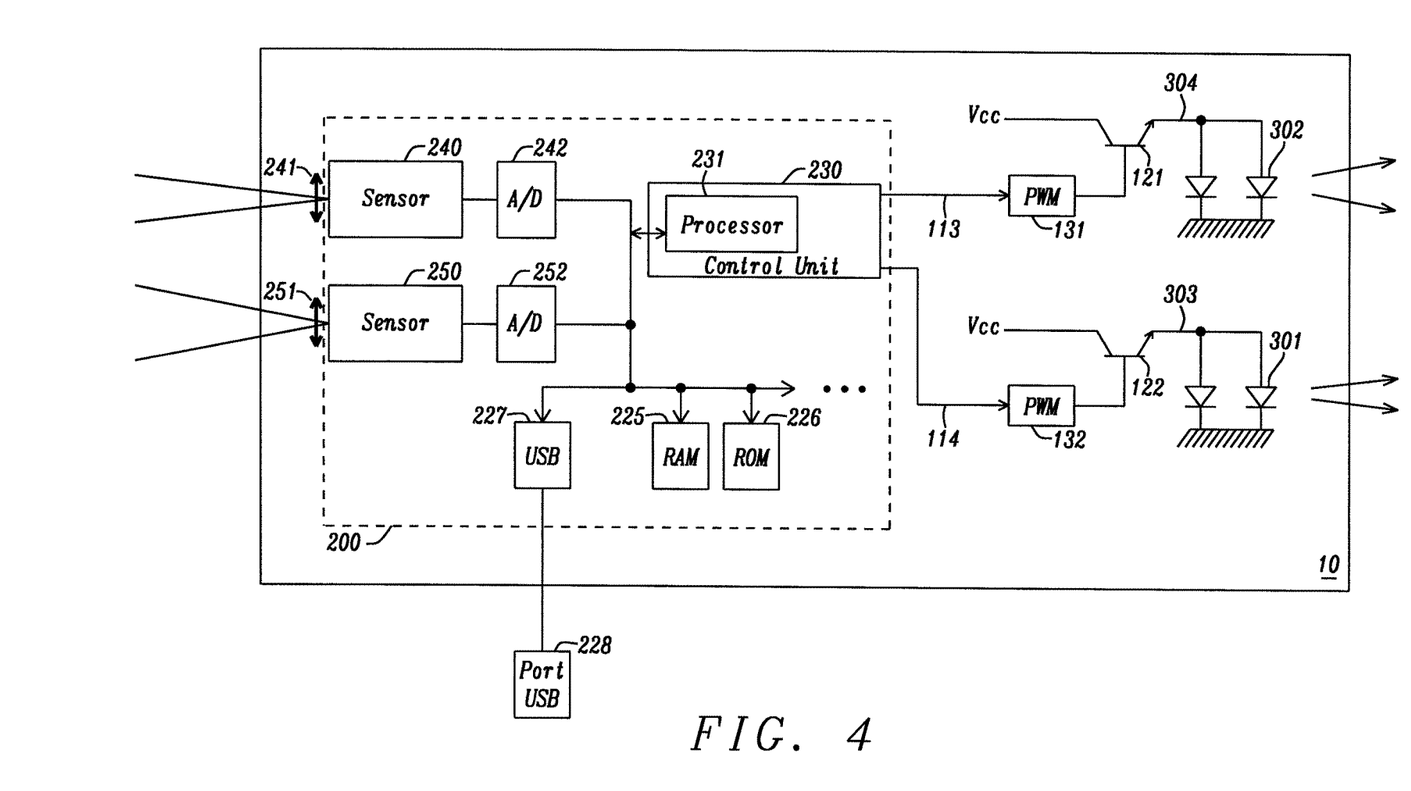
FIG. 4 illustrates a specific example of the realization of the first embodiment.

FIG. 4 describes in detail the second embodiment that was described in relation with FIG. 2, which shows that the power module 100 includes a battery (not shown in the figure), which generates a voltage Vcc. Also, there are two power switches, respectively 121 and 122 for supplying current to the LEDs 301 and 302 respectively controlled by the circuits 132 and 131 employing the PWM modulation or PWM. Switches 121 and 122 are for example semiconductor devices such as a bipolar transistor, an FET (Field Effect Transistor) or MOS (Metal Oxide Semiconductor) or MOSFET.

Both switches 121 and 122 are respectively controlled by the control information or control signals 113 and 114 generated by a control unit 230 integrated within control module 200.

It is here that an embodiment, and a skilled person could clearly use other examples of architecture, including by consolidating the two circuits 121 and 122 in a same electronic circuit.

Still referring to FIG. 4, one sees that control unit 230 includes a signal processor 231 communicating via conventional address bus and control data with the RAM 225, the ROM or EEPROM 226.

Illustratively, sensors 240 and 250 which are shown in FIG. 2 are analog sensors with its optical systems 241 and 251, and associated with an analog/digital converter 242 (resp. 252) allowing the generation of digital information that can then be made available to the signal processor 231 via the data bus, address . . . .

In a preferred embodiment, photosensors 240 and 250 have an axis substantially parallel to the axis of the LED diodes so as to ensure that the solid angles of these sensors correspond to the area illuminated by the latter.

In another embodiment, a USB port 228 is accessible via a USB module 227 included in the control unit and connected to the bus, allowing data exchange according to the USB standard. Specifically, as mentioned above, the USB interface will allow the storage setting parameters and profiles within the lamp.

In this way, control unit 230 may communicate with a data processing device such as a computer, a laptop, a touch pad, a personal assistant and even a smart phone.

Note that the USB port is only an illustrative example of a means of communication between the lamp and a computer, and a skilled person will consider other means of communication, including wireless (bluetooth, wifi etc). In a particular embodiment, the headlamp may even have its own Internet Protocol IP address to be easily configured, for example through a dedicated web server.

Such communication is particularly advantageous particularly for the exchange of configuration data, such as "profiles" that may serve for storing or selecting, as appropriate, the lamp adjustment data according to its intended use by its owner. Alternatively or cumulatively, the "profiles" allow, as is discussed below, to activate procedures or specific operating modes, including static modes (switch-off of the dynamic or reactive lighting regulation) or dynamic mode (switch on of the dynamic or reactive lighting regulation)

Advantages of the Invention

By allowing the joint control of both the light beam and the angle(s) associated to the sensor(s) used for the dynamic regulation, the headlamp becomes particularly more efficient, more comfortable for the user, particularly in the following situations:
When the distance between the lamp and the illuminated surface is low and the surface is composed of several colors of very different contrasts (e.g., black, white etc . . . )
When the user moves a short distance away in a hilly environment (working under a car hood), adaptation is improved by minimizing the disturbance effects caused by holes, reflective surfaces and different colors
When the user is in front of a lamp, adaptation is less disturbed by the user's head movements, particularly with respect to the light of the lamppost
The disturbance due to the midway obstacles when the user looks to the horizon
When a runner is running within a group of runners with some of them wearing highly reflective clothes.
In all these situations, the invention allows avoiding or reducing unwanted variations in brightness; all of which are sources of discomfort for users.

What is claimed is:

1. A lamp comprising
   a light source having one or more LED-type diodes;
   means for controlling the brightness and/or the geometry of said light beam of said light source in response to a control information or control signal;
   capturing means for sensing light and generating an electrical signal representative of the reflected light intensity of the area illuminated by said light;
   a control unit for generating said control information or said control signal from the information generated by said capturing means;
   wherein said capturing means is associated with a variable focal field controlled by said control unit to generate corresponding electrical signals at different focal lengths.

2. The lamp according to claim 1 wherein said capturing means comprises:
   a first sensor associated with a first optical system for generating an electrical signal representative of the reflected light intensity of the area illuminated by said light beam onto an illuminated object;
   a second sensor associated with a separate second optical system of the first optical system to generate a second information representative of the reflected light intensity of the illuminated area,
   wherein said control unit is adapted to select one or the other signals generated by said first and second sensor, the control of said light beam resulting from the information generated by one or the other of said sensors.

3. The lamp of claim 2 wherein the light source comprises a display unit having at least two LEDs, each having a focal own optical system and whose power supply is controlled by said control information or control signal.

4. The lamp of claim 2 wherein the light source comprises one or more LED(s) associated with a controllable optical system, said optical system being controlled by said control information or said control signal.

5. The lamp according to claim 1 wherein said capturing means comprises
a sensor associated with an optical system is electrically controllable and configured to be controlled by said control unit,
wherein said control unit jointly generates said control signal or control information for controlling the brightness and said control signal controlling said electrically controllable optical system.

6. The lamp according to claim 1, wherein said control module further comprises telemetry means for determining the distance to an object in order to jointly use the measurement of distance for the generation of control information or control signal of the light beam and/or the capture angle of said capturing means.

7. The lamp of claim 6 wherein said configuration is performed via a USB port for communication with a computer, a touchscreen tablet, or smartphone.

8. The lamp according to claim 1 wherein the control unit is configured with parameters corresponding to a plurality of predetermined profiles.

9. The lamp according to claim 1 wherein it consists of a headlamp.

10. A method of providing a lamp comprising
a light source having one or more LED-type diodes;
controlling the brightness and/or the geometry of said light beam of said light source in response to a control information or control signal;
sensing light and generating an electrical signal representative of the reflected light intensity of the area illuminated by said light, by a capturing means;
a control unit for generating said control information or said control signal from the information generated by said capturing means;
wherein said capturing means is associated with a variable focal field controlled by said control unit to generate corresponding electrical signals at different focal lengths.

11. The method according to claim 10 wherein said capturing means comprises:
a first sensor associated with a first optical system for generating an electrical signal representative of the reflected light intensity of the area illuminated by said light beam onto an illuminated object;
a second sensor associated with a separate second optical system of the first optical system to generate a second information representative of the reflected light intensity of the illuminated area,
wherein said control unit is adapted to select one or the other signals generated by said first and second sensor, the control of said light beam resulting from the information generated by one or the other of said sensors.

12. The method of claim 11 wherein the light source comprises a display unit having at least two LEDs, each having a focal own optical system and whose power supply is controlled by said control information or control signal.

13. The method of claim 11 wherein the light source comprises one or more LED (s) associated with a controllable optical system, said optical system being controlled by said control information or said control signal.

14. The method according to claim 10 wherein said capturing means comprises
a sensor associated with an optical system is electrically controllable and is controlled by said control unit,
wherein said control unit jointly generates said control signal or control information for controlling the brightness and said control signal controlling said electrically controllable optical system.

15. The method according to claim 10, wherein said control module further comprises determining the distance to an object, by telemetry means in order to jointly use the measurement of distance for the generation of control information or control signal of the light beam and/or the capture angle of said capturing means.

16. The method of claim 15 wherein said configuration is performed via a USB port for communication with a computer, a touchscreen tablet, or smartphone.

17. The method according to claim 10 wherein the control unit has parameters corresponding to a plurality of predetermined profiles.

18. The method according to claim 10 wherein it consists of a headlamp.

* * * * *